United States Patent [19]

Horikawa

[11] Patent Number: 4,899,958
[45] Date of Patent: Feb. 13, 1990

[54] AIR INTAKE SYSTEM OF AN AIRCRAFT

[75] Inventor: Makoto Horikawa, Nagoya, Japan

[73] Assignee: Mitsubishi Jukogyo Kabushiki Kaisha, Tokyo, Japan

[21] Appl. No.: 280,156

[22] Filed: Dec. 5, 1988

[51] Int. Cl.$^4$ .............................................. B64B 1/24
[52] U.S. Cl. ................................. 244/53 B; 137/15.1; 244/55; 244/15
[58] Field of Search ................. 244/53 B, 55, 15, 208, 244/209, 36; 137/15.1, 15.2

[56] References Cited

U.S. PATENT DOCUMENTS

| | | | |
|---|---|---|---|
| 2,586,999 | 2/1952 | Burnelli | 244/15 |
| 3,023,981 | 3/1962 | Reiniger | 244/15 |
| 3,097,817 | 7/1963 | Towzey, Jr. | 244/209 |
| 3,202,383 | 8/1965 | Le Bel et al. | 244/209 |
| 3,915,413 | 10/1975 | Sargisson | 137/15.2 |

Primary Examiner—Galen L. Barefoot
Attorney, Agent, or Firm—Wenderoth, Lind & Ponack

[57] ABSTRACT

An air intake system of an aircraft is improved so that a performance of the air intake system will not be degraded even during flight at a large angle of attack and at high mobility of the aircraft while at the same time secretiveness or security of the aircraft against radar beam irradiation from below will be maintained. The air intake system includes a main air intake port provided on an upper surface of the airframe of the aircraft, an auxiliary air intake port provided on a lower surface of the airframe, and a closure member for the auxiliary air intake port and which is movable between a closed position and an open position of the auxiliary air intake port.

7 Claims, 1 Drawing Sheet

AIR INTAKE SYSTEM OF AN AIRCRAFT

BACKGROUND OF THE INVENTION

1. Field of the Invention

The present invention relates to an air intake system of an aircraft and having an excellent secretiveness (stealth).

2. Description of the Prior Art

Heretofore it has been known that if an air intake port of an air intake system of an aircraft is provided on an upper surface of an airframe of the aircraft, the secretiveness or security of the aircraft will be high, especially against radair beam irradiation from below, i.e., on the lower surface of the airframe. However, since turbulence of air on the upper surface of the airframe is violent and the performance at such an air intake port is degraded upon taking a large angle of attach and at high mobility, it was difficult to practically employ such system.

In other words, in the prior art if it is contemplated to dispose an air intake port having excellent secretiveness on an upper surface of an airframe, when the aircraft takes a large angle of attack and at high mobility, the air intake port would introduce to the engine tubulent air on the upper surface of the airframe, and thus the performance (total pressure recovery, distortion, etc.) of the air intake port would be degraded. Under such circumstances, the engine would stop frequently, resulting in fatal shortcomings for an airframe having high mobility.

SUMMARY OF THE INVENTION:

It is therefore one object of the present invention to provide an improved air intake system of an aircraft, which has excellent secretiveness against radar beam irradiation from below and yet wherein the performance of an air intake port would not be degraded even when the aircraft takes a large angle of attack and at high mobility or maneuverability.

According to one feature of the present invention, there is provided an air intake system of an aircraft comprising a main air intake port provided on an upper surface of an airframe of the aircraft, an auxiliary air intake port provided on a lower surface of the airframe, and a closure member which is movable between a closed position closing the auxiliary air intake port and an open position for opening the auxiliary air intake port.

In the air intake system according to the present invention, during normal cruising flight the auxiliary air intake port on the lower surface of the airframe is closed by the closure member to maintain secretiveness of the aircraft and air is intaken through the main air intake port on the upper surface of the airframe.

When turbulence of air on the upper surface of the airframe is violent and performance of the main air intake port this is degraded upon a large angle of attack and at high mobility of the aircraft as described above, according to the present invention, under the aforementioned flight conditions, it is possible to intake air through the auxiliary air intake port on the lower surface of the airframe by moving the closure member for the auxiliary air intake port to the open position and thereby eject the turbulent air intaken through the main air intake port, thereby stabilizing the operation of the engine.

The aforementioned auxiliary air intake port on the lower surface of the airframe is normally closed as described above, and hence reflectiveness of radar irradiation from below will be lowered, and thereby secretiveness of the aircraft can be enhanced.

The above-mentioned and other objects, features and advantages of the present invention will become more apparent by reference to the following description of one preferred embodiment of the invention taken in conjunction with the accompanying drawings.

Figure 1:
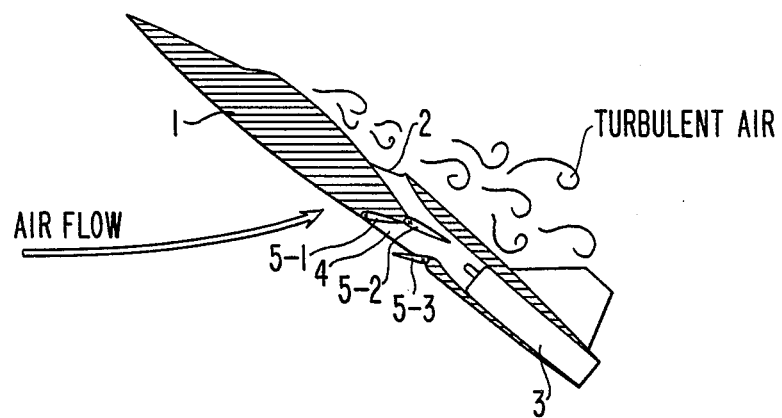
FIG. 1 is a schematic view showing the state of an aircraft according to one preferred embodiment of the present invention during a flight taking a large angle of attack and FIG. 2 is a schematic view showing another state of the same aircraft during a normal cruising flight.

DESCRIPTION OF THE PREFERRED EMBODIMENT:

One preferred embodiment of the present invention now will be described with reference to FIGS. 1 and 2.

In these figures, reference numeral 1 designates an airframe of an aircraft, and on the upper surface of the airframe 1 is provided a main air intake port 2 for feeding air to an engine 3. In addition, there is provided an auxiliary air intake port 4 opening at the lower surface of the airframe and communicating with the above-mentioned main air intake port 2. On the front wall of the auxiliary air intake port 4 are disposed two movable vanes 5-1 and 5-2, while on the rear wall of the same port 4 is disposed a single movable vane 5-3. During normal flight (upon cruising) the inlet of the auxiliary air intake port 4 is closed by the movable vanes 5-1 and 5-3 and communication between the auxiliary air intake port 4 and the main air intake port 2 is interrupted by the movable vane 5-2 as shown in FIG. 2. However, during flight with a large angle of attack, as shown in FIG. 1, the movable vanes 5-1 and 5-3 are rotated to open the auxiliary air intake port 4, and the movable vane 5-2 is also rotated in a direction to at least partially close the main air intake port 2 and to communicate the auxiliary air intake port 4 with the engine 3.

When the auxiliary air intake port 4 is opened, since the movable vane 5-3 on the rear wall of the intake port 4 has its tip end projected forwards in a scoop shape, it can efficiently lead air into the auxiliary air intake port 4.

Figure 2:
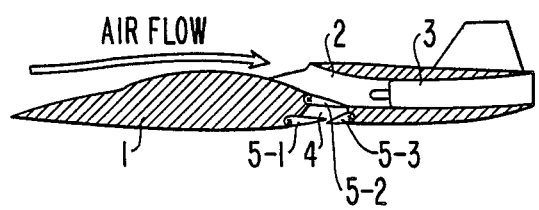

Since the air intake system according to the illustrated embodiment has the above-described construction, during normal flight the auxiliary air intake port 4 on the lower surface of the airframe is closed and instead the main air intake port 2 on the upper surface of the airframe is used as shown in FIG. 2. However, if the aircraft assumes a large angle of attack and at high mobility or maneuverability, the air flow along the upper surface of the airframe flowing into the main air intake port 2 begins to become turbulent as shown in FIG. 1, and then switching to the auxiliary air intake port 4 on the lower surface of the airframe is commenced. For the purpose of this switching, the movable vanes 5-1, 5-2 and 5-3 are operated by hydraulic actuators, not shown, and the angle of attack, pitch angular velocity, Mach number, etc. are detected by sensors, also not shown. The above-mentioned hydraulic actuators are actuated in accordance with instructions programmed as a function of such factors of angle of attack, pitch angular velocity, Mach number, etc. Hence, the movable vanes 5-1, 5-2 and 5-3 move in an analog manner in response to the instructions to open the auxiliary air intake port 4 and to interrupt the communication between the main air intake port 2 and the engine 3. Thus, a stable airflow is fed from the auxiliary air intake port 4 to the engine 3. Thereby, regular operation of the engine 3 can be insured.

According to the above-described embodiment, during normal flight, the auxiliary air intake port 4 on the lower surface of the airframe is closed and secretiveness of the aircraft against radar beam irradiation from below can be insured. It is to be noted that while the auxiliary air intake port 4 on the lower surface of the airframe is opened during flight with a large angle of attack, secretiveness is lowered. However, generally upon flight with a large angle of attack, the degree of demand for therefore secretiveness is low, and so, practically there would be no disadvantage.

In addition, while the auxiliary air intake port in the above-described embodiment is constructed in such manner that it can be opened or closed as a result of swinging or pivoting motions of movable vanes, there also can be employed as the closure member for the auxiliary air intake port according to the present invention a slide type closure member which can slide in directions parallel to the lower surface of the airframe. It is a matter of course that the type of the auxiliary air intake port should not be limited to that employed in the illustrated embodiment.

As described in detail above, according to the present invention the main air intake port on the upper surface of the airframe and having excellent secretiveness is employed during normal flight. The degradation of the performance at such main air intake port during flight at a large angle of attack which is inherent in the prior art air intake system of such type is eliminated by opening the auxiliary air intake port provided on the lower surface of the airframe upon flight at a large angle of attack. Thereby stable operation of the engine can be assured.

While a principle of the present invention has been described above in connection to one preferred embodiment, it is a matter of course that many apparently widely different embodiments of the present invention could be made without departing from the spirit of the invention.

What is claimed is:

1. In an air intake system for use in an aircraft having an airframe, said air intake system including a main air intake port at an upper surface of the airframe, whereby during normal cruising flight suitable air intake will be through said main air intake port and a lower surface of the airframe will have low reflectiveness of radar beam irradiation from below, but whereby during flight at a large angle of attack and at high maneuverability air turbulence at said main air intake port will prevent suitable air intake therethrough, the improvement comprising means for ensuring suitable air intake at flight at said large angle of attack and at high maneuverability and for maintaining said low reflectiveness during normal cruising flight, said means comprising:

an auxiliary air intake port at the lower surface of the airframe intake of air therethrough; and closure means mounted on said air frame for movement between an open position, whereat said closure means opens said auxiliary air intake port and allows suitable air intake therethrough during flight at said large angle of attack and at high maneuverability, and a closed position, whereat said closure means closes said auxiliary air intake port and thereby maintains said low reflectiveness during normal cruising flight.

2. The improvement claimed in claim 1, wherein said closure means comprises first and second vanes movably mounted at forward and rearward ends, respectively, of said auxiliary air intake port.

3. The improvement claimed in claim 2, wherein said first and second vanes open inwardly and outwardly, respectively, of the airframe.

4. The improvement claimed in claim 3, wherein said second vane has a scoop-shaped configuration and projects forwardly in the open position thereof.

5. The improvement claimed in claim 2, further comprising means for, upon opening said auxiliary air intake port, at least partially closing said main air intake port.

6. The improvement claimed in claim 5, wherein said closing means comprises a third vane mounted adjacent said forward end of said auxiliary air intake port for movement between a first position, opening said main air intake port and blocking communication between said auxiliary air intake port and said main air intake port, and a second position, at least partially interrupting said main air intake port and opening communication between said auxiliary air intake port and said main intake port.

7. The improvement claimed in claim 1, further comprising means for, upon opening said auxiliary air intake port, at least partially closing said main air intake port.

* * * * *